(12) United States Patent
Warnes et al.

(10) Patent No.: US 10,657,003 B2
(45) Date of Patent: May 19, 2020

(54) PARTIAL BACKUP DURING RUNTIME FOR MEMORY MODULES WITH VOLATILE MEMORY AND NON-VOLATILE MEMORY

(71) Applicant: HEWLETT PACKARD ENTERPRISE DEVELOPMENT LP, Houston, TX (US)

(72) Inventors: Lidia Warnes, Roseville, CA (US); Patrick M. Schoeller, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 66 days.

(21) Appl. No.: 15/565,213

(22) PCT Filed: Apr. 10, 2015

(86) PCT No.: PCT/US2015/025226
§ 371 (c)(1),
(2) Date: Oct. 9, 2017

(87) PCT Pub. No.: WO2016/164033
PCT Pub. Date: Oct. 13, 2016

(65) Prior Publication Data
US 2018/0074907 A1   Mar. 15, 2018

(51) Int. Cl.
*G06F 11/00* (2006.01)
*G06F 11/14* (2006.01)
(Continued)

(52) U.S. Cl.
CPC ........ *G06F 11/1441* (2013.01); *G06F 9/4401* (2013.01); *G06F 11/1666* (2013.01); *G06F 11/2015* (2013.01)

(58) Field of Classification Search
CPC ............ G06F 11/1666; G06F 11/1446; G06F 11/1448; G06F 11/1451; G06F 11/1466
See application file for complete search history.

(56) References Cited

U.S. PATENT DOCUMENTS 7,830,732 B2   11/2010   Moshayedi et al.
9,727,462 B2 *   8/2017   Nguyen ............ G11C 14/0018
(Continued)

FOREIGN PATENT DOCUMENTS

WO   WO-2014120140   8/2014

OTHER PUBLICATIONS

Singh, S., Non-volatile SRAMS (NVSRAMS) in Gaming Applications, (Research Paper), Apr. 2012, 6 Pages.

*Primary Examiner* — Philip Guyton
(74) *Attorney, Agent, or Firm* — Hewlett Packard Enterprise Patent Department

(57) ABSTRACT

In one example in accordance with the present disclosure, a system for partial backup during runtime includes a memory module having a volatile memory and a non-volatile memory. The system also includes a backup controller. The backup controller determines that a backup should occur in the memory module. The backup controller determines a backup domain of the volatile memory. The backup controller causes a deactivation domain of the volatile memory to be deactivated, where the deactivation domain includes the backup domain. The backup controller causes the backup to initiate during normal runtime of the system. The backup includes data in the backup domain of the volatile memory being saved to the non-volatile memory.

11 Claims, 4 Drawing Sheets

(51) Int. Cl.
    *G06F 11/16*     (2006.01)
    *G06F 11/20*     (2006.01)
    *G06F 9/4401*     (2018.01)

(56) References Cited

U.S. PATENT DOCUMENTS

| | | |
|---|---|---|
| 2008/0177961 A1 | 7/2008 | McSharry et al. |
| 2010/0205470 A1 | 8/2010 | Moshayedi et al. |
| 2011/0078277 A1* | 3/2011 | Baptist .................. G06F 3/0617 709/217 |
| 2011/0271144 A1 | 11/2011 | James et al. |
| 2014/0059311 A1 | 2/2014 | Oberhofer et al. |
| 2014/0189234 A1 | 7/2014 | Krishnamurthy et al. |
| 2014/0304462 A1 | 10/2014 | Venugopal et al. |
| 2015/0161012 A1* | 6/2015 | Meier .................. G06F 11/1458 707/649 |

* cited by examiner

PARTIAL BACKUP DURING RUNTIME FOR MEMORY MODULES WITH VOLATILE MEMORY AND NON-VOLATILE MEMORY

BACKGROUND

A computing system may include a number of memory modules. These memory modules may serve as system memory or "primary memory" of the system, which may store information for running programs and the like. These memory modules may serve also, in some situations, serve as "secondary memory" or longer term storage, to store information of the system, even after power cycles. Some memory modules include at least one volatile memory (i.e., memory cell) and at least one non-volatile memory (i.e., memory cell).

BRIEF DESCRIPTION OF THE DRAWINGS

The following detailed description references the drawings, wherein.

DETAILED DESCRIPTION

Figure 1:
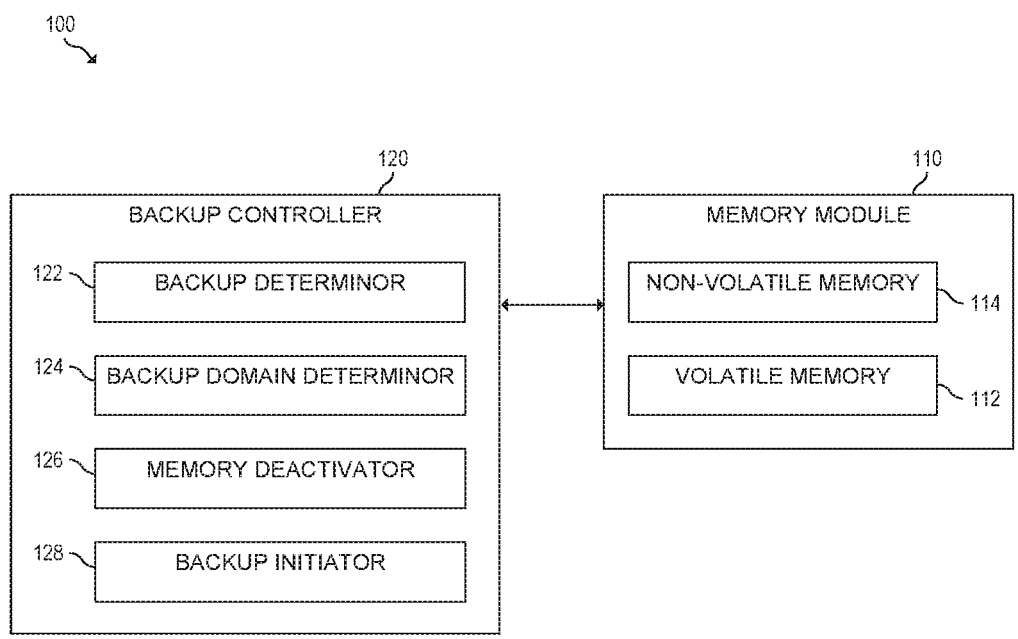
FIG. 1 is a block diagram of an example computing system for partial backup during runtime for memory modules with volatile memory and non-volatile memory.

A computing system may include a number of memory modules. These memory modules may serve as system memory or "primary memory" of the system, which may store information for running programs and the like. These memory modules may also, in some situations, serve as "secondary memory" or longer term storage, to store information of the system, even after power cycles. Some memory modules include at least one volatile memory (i.e., memory cell) and at least one non-volatile memory (i.e., memory cell). The volatile memory may be, for example, DRAM (Dynamic Random Access Memory), SRAM (Static Random Access Memory) or the like. The non-volatile memory may be, for example, flash memory, memristor memory or the like.

For some systems that include memory modules having volatile memory and a non-volatile memory, during runtime of the system, the system (e.g., an operating system) may store data in the volatile memory. Then, when a power-loss event occurs (e.g., system failure), data from the volatile memory may be copied to the non-volatile memory for backup/persistence purposes. This data that is copied to the non-volatile memory, may then be used upon reboot or power cycle of the system, to restore the system state. In short, in such systems, the backup of data from volatile to non-volatile memory is performed when the system crashes, reboots, shuts down, etc. (not during runtime). Such operation may present issues. For example, backup at the time of a power-loss even requires a backup-power source to power the data transfer, and such a backup-power source may become a single point of failure in the system. Additionally, because the data backup likely occurs after a failure, the data being transferred to the non-volatile memory may be corrupted (e.g., if the error was uncorrectable), and if the backup data is corrupted, the system may be unable to restore the system state from corrupted data. Therefore, such a system may be less reliable.

For some systems that include memory modules having volatile memory and a non-volatile memory, data from the volatile memory may be copied to the non-volatile memory during runtime of the system. However, in these systems, when a backup is initiated, all the data in the volatile memories of the system is transferred to non-volatile memories. To accommodate this backup, the memory controller of the system is prevented from issuing any memory operations on the entire memory bus. In other words, the memory controller, during the backup, relinquishes control of all the memory modules of the system. Such a "full" backup can be time consuming. For example, backing up one full memory module could take up to 2 minutes.

The present disclosure describes partial backup during runtime for memory modules with volatile memory and non-volatile memory. According to the present disclosure, in a system, a backup controller may determine that, during normal runtime of the system, a backup should occur in a memory module with volatile memory and non-volatile memory. Further, the backup controller may determine a backup domain of the volatile memory, where the backup domain may indicate a portion of the volatile memory (e.g., a range of memory addresses) that is to be backed up. The backup controller may deactivate a portion of or all of the volatile memory that includes the backup domain, where the deactivation includes preventing access by a memory controller to that portion during backup. The backup controller may then initiate the backup during normal runtime of the system. The backup controller may then initiate the backup by, for example, causing the memory module to enter a self-refresh mode or routine. Because the backup controller deactivates only a portion of the total memory of the system during backup, the rest of the memory (e.g., the rest of the memory module or memory in other memory modules of the system) may continue to be accessed and used as normal by the system during backup. After each backup, the backup controller enables the system to come back or transition back to a normal operating state (e.g., where all memory can be accessed).

The present disclosure may provide a more reliable backup method than examples described above where backup is performed at the time of a power-loss event. Because backups are performed during normal runtime of the system (e.g., not when the system crashes, reboots, shuts down, etc.), the backup power source is essentially eliminated as a single source of failure. According to the present disclosure, some backups may still be performed at the time of a power-loss event, but the amount of data that would need to be backed up is much less, and thus, the size (and cost) of the backup power source needed is significantly reduced. Additionally, because the data is backed up during runtime (when the system is in a healthy state), the backed up data is likely healthy data (i.e., not corrupted), and thus, the probability that the system could be restored from the backup data if need be is much higher. Additionally, compared to examples described above where full backups are performed at runtime, the present disclosure offers significant time savings. Partial backups during runtime can be performed much more quickly than full backups. Further-more, boot time may be significantly decreased because, as described above, a smaller backup power source may be used which takes less time to charge at system startup. Boot time is also reduced when the data that is being used to restore the system state is healthy, as is the case with the solutions of the present disclosure.

FIG. 1 is a block diagram of an example computing system 100 for partial backup during runtime for memory modules with volatile memory and non-volatile memory. System 100 may be any computing system or computing device capable of using memory modules that include both volatile memory and non-volatile memory. System 100 may include at least one memory module (e.g., 110) and at least one backup controller (e.g., 120). Backup controller 120 may include a backup determinor 122, a backup domain determinor 124, a memory deactivator 126 and a backup initiator 128. System 100 may be similar to system 200 of FIG. 2 in many respects. For example, memory module 110 may be similar to memory module 210, and backup controller 120 may be similar to backup controller 220. Additionally, components 122, 124, 126, 128 of backup controller 120 may be similar to like-named components of backup controller 220.

Memory module 110 includes a volatile memory 112 and a non-volatile memory 114. Backup controller 120 may determine (e.g., via backup determinor 122) that a backup should occur in memory module 110. Backup controller 120 may determine (e.g., via backup domain determinor 124) a backup domain of the volatile memory 112. Additional description of backup domains is provided below. Backup controller 120 may cause (e.g., via memory deactivator 126) a deactivation domain of volatile memory 112 to be deactivated, where the deactivation domain includes the backup domain. Backup controller 120 may cause (e.g., via backup initiator 128) the backup to initiate during normal runtime of the system (e.g., not when the system crashes, reboots, shuts down, etc.). The backup process includes data in the backup domain of the volatile memory being saved to the non-volatile memory.

Figure 2:
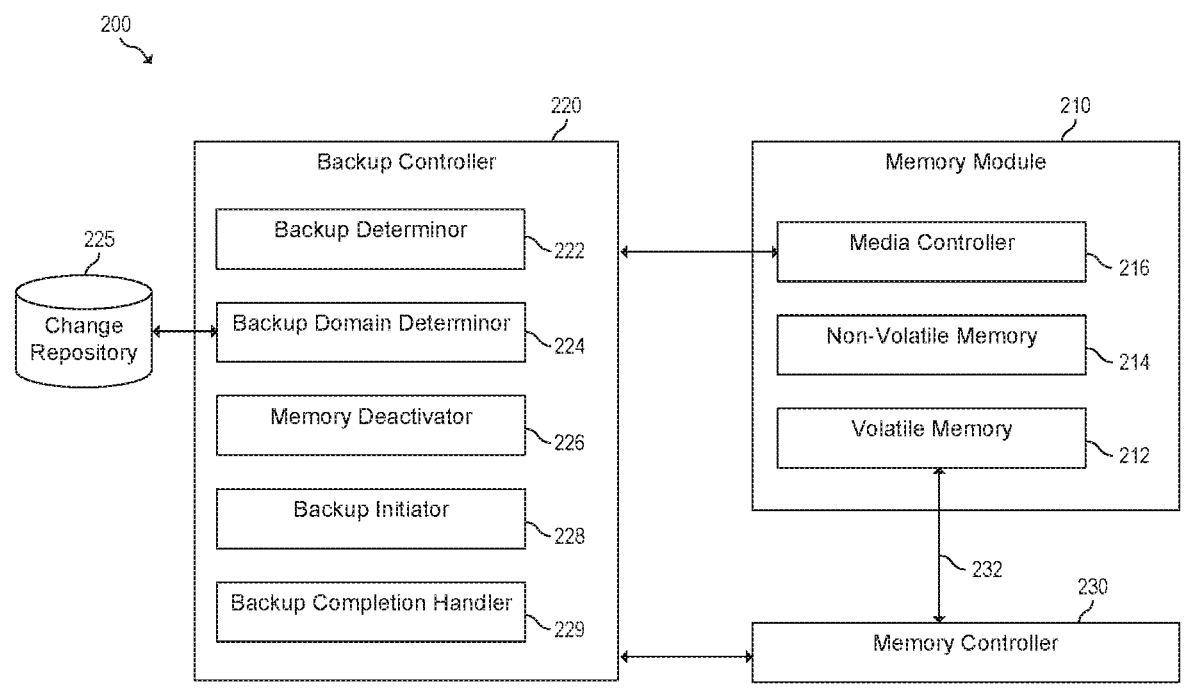
FIG. 2 is a block diagram of an example computing system for partial backup during runtime for memory modules with volatile memory and non-volatile memory.

FIG. 2 is a block diagram of an example computing system 200 for partial backup during runtime for memory modules with volatile memory and non-volatile memory. System 200 may be any computing system or computing device capable of using memory modules that include both volatile memory and non-volatile memory. System 200 may include at least one memory module (e.g., 210) and at least one backup controller (e.g., 220). In operation, during runtime of system 200, data from the volatile memory of memory module 210 may be copied to the non-volatile memory of memory module 210. Backup controller 220 may coordinate when such backups occur, which data should be backed up, and various other aspects of backups. System 200 may be similar to system 100 of FIG. 1 in many respects, and components of system 200 as described herein may provide convey similar details to like-named components of system 100.

Memory module 210 may be any type of memory module, for example, a dual inline memory module (DIMM). Memory module 210 may be accessed by a processor, operating system and/or other components of system 200 to access memory in the memory module. Such accesses may be performed via a memory controller 230 and memory bus 232 of system 200. For example, memory controller 230 may interface directly with volatile memory 212 via memory bus 232. Access of memory module 210 via memory controller 230 and memory bus 232 may be considered the "regular" manner of accessing the memory module, to write data to and read data from the memory module during the usual runtime operation of system 200. Memory controller 230 may also provide access to additional memory modules of system 200 that are similar to memory module 210.

Memory module 210 may include at least one volatile memory (e.g., 212), which may be, for example, DRAM (Dynamic Random Access Memory), SRAM (Static Random Access Memory) or the like. Memory module 210 may include at least one non-volatile memory (e.g., 214), which may be, for example, flash memory, memristor memory or the like. Memory module 210 may include a media controller 216 that may communicate with non-volatile memory 214 and may communicate with volatile memory 212. Memory module 210 may also be in communication with backup controller 220, and in this respect, backup controller 220 may (via media controller 216) perform operations on non-volatile memory 214 and/or volatile memory 212 without communicating through the "regular" manner (i.e., through the memory controller 230 and memory bus 232).

Memory module 210 may be placed in a self-refresh mode at various times. The term self-refresh traditionally referred to a routine where a volatile memory refreshed itself to avoid data loss. Volatile memories may include capacitors to store data, and those capacitors must have their charge replenished from time to time. The term self-refresh has taken on additional meanings as memory modules have evolved. A self-refresh routine may include, for example, flushing Input/Output (IO) buffers. A self-refresh routine for a memory module (e.g., 210) may include copying data from at least one volatile memory (e.g., 212) to at least one non-volatile memory (e.g., 214). As used herein, the term self-refresh primarily refers to this copying of data, and may refer to copying all data in the volatile components of the memory module or part of the data in volatile components, as is described in more detail herein.

Memory module 210 may be placed in a self-refresh mode in various manners. For example, memory controller 230 may cause memory module 210 to enter a self-refresh mode. In these examples, backup controller 220 may send ADR (Asynchronous DRAM Refresh) commands to memory controller 230, and memory controller 230 may receive and interpret these ADR commands. Memory controller 230 may then signal to memory module 210 (e.g., over memory bus 232) that memory controller 210 should enter a self-refresh mode. At this point, media controller 216 may take over to perform a backup of data from volatile memory 212 to non-volatile memory 214. ADR commands may also convey desired contours of the self-refresh, for example, which data should be copied from the volatile memory to the non-volatile memory.

In another example, memory module 210 may be placed in a self-refresh mode by backup controller 220 communicating directly with media controller 216. For example, backup controller 220 may send commands (i.e., "direct media commands") to media controller 216. Media controller 216 may interpret the direct media commands and, in response, place the memory module 210 in self-refresh mode. Media controller 216 may then take over to cause part or all of the data from volatile memory 212 to be copied/backed up to non-volatile memory 214. Direct media commands may also convey desired contours of the self-refresh, for example, which data should be copied from the volatile memory to the non-volatile memory.

Backup controller 220 may coordinate when backups occur in memory module 210 from volatile memory 212 to non-volatile memory 214, as well as when backups occur in other memory modules of system 200. Backup controller 220 may also determine which data should be backed up, and various other aspects of backups. In some examples, backup controller 220 may be electronic circuitry (i.e., hardware) that implements the functionality of the backup controller. Backup controller 220 may also include software and/or firmware. For example, backup controller 220 may be implemented partially or fully in system firmware (e.g., BIOS or Basic Input/Output System) and/or in the chipset of system 200. As another example, backup controller 220 may be implemented partially or fully in a dedicated integrated circuit such as an ASIC (application-specific integrated circuit), or in a dedicated FPGA (field-programmable gate array). In some examples, backup controller 220 may be implemented as instructions (e.g., stored on a machine-readable storage medium of system 200) that, when executed (e.g., by a processor of system 200), offer the functionality of the backup controller. For example, backup controller may be implemented partially or fully in an operating system of system 200 that runs on a central processing unit (CPU) of system 200.

Backup controller 220 may include a backup determinor 222, a backup domain determinor 224, a memory deactivator 226, a backup initiator 228 and a backup completion handler 229. Each of these components may be implemented as hardware or some combination of hardware and software/firmware as described above regarding backup controller 220 generally.

Backup determinor 222 may determine when a backup of volatile data in memory module 210, and perhaps other memory modules of system 200, should occur. For example, backup determinor 222 may detect a signal from an operating system of system 200 that indicates that a backup should occur. In this example, the operating system may be external to backup controller 210 and backup determinor 222 may be responsive to the operating system determination of when a backup should occur. As another example, backup determinor 222 may be part of the operating system, and thus, the determination of when the backup should occur may originate in the backup determinor 222. Regardless of where the determination of when the backup should occur originates, the timing of backups is determined. Backups may be scheduled, for example, during idle computing periods in system 200, e.g., when the processing of other jobs in the system is at a minimal level. As another example, backups may be scheduled periodically, e.g., at regular time intervals. In both of the above examples, backup determinor 222 schedules backups during normal runtime of system 200, pre-emptively before a power-loss event occurs (e.g., not when the system crashes, reboots, shuts down, etc.). However, it should be understood that system 200 may initiate additional backups when a power-loss event occurs. Once backup determinor 222 determines that a backup should occur, it may signal this to backup domain determinor 224.

Backup domain determinor 224 may determine a part of volatile memory in system 200 that should be backed up. In some examples, backup domain determinor 224 may determine that all volatile memory (e.g., all volatile memories such as 212 in all memory modules such as 210) in system 200 should be backed up. This would be a full backup. However, backup domain determinor 224 may determine that a partial backup should occur. A partial backup, for example, may be a backup of the volatile data in just one memory module (e.g., 210), or it may be a backup of just part of the volatile data in a particular memory module (e.g., 210). The term "backup domain" may be used herein to refer to the portion of volatile memory (e.g., within one or multiple memory modules of system 200) that is to be backed up during any particular backup. A backup domain may be defined by a range of memory addresses, for example. A range of memory addresses could identify a particular memory module (e.g., 210) and could identify, within that memory module, a particular portion of volatile memory (e.g., 212). Further examples described below, for easy of description, may refer to partial backups within a particular memory module (210). However, it should be understood that the present disclosure also contemplates full backups and also partial backups that may include memory portions that span multiple memory modules of system 200.

Backup domain determinor 224 may determine the backup domain in various ways. For example, backup domain determinor 224 may segment the total system memory into defined chunks, and when a backup is started, one or more of those chunks may be translated to determine the "backup domain" in the volatile memory, and this may get backed up during a particular backup. Then, on a subsequent backup, one or more additional chunks could get backed up, and so on.

In other examples, backup domain determinor 224 may determine the backup domain by determining which memory/data is most in need of backup. For example, memory locations with data that has been changed since a previous backup may be determined and translated to calculate the backup domain for a current backup. System 200 may include a change repository 225 that may store information about memory locations that have data that has been modified since a last backup. In this respect, backup of memory modules with volatile and non-volatile components may be performed in an incremental manner. Change repository 225 may be maintained (i.e., updated and written to as various updates take place) by backup domain determinor 224, or by the operating system of system 200, e.g., in the examples where backup controller 220 is not part of the operating system. Change repository 225 may be a data store that stores digital information and may include or be in communication with at least one physical storage mechanism (e.g., hard drive, solid state drive, flash memory, other non-volatile memory, or the like) capable of storing information including, for example, a digital database, a file capable of storing text, settings or the like.

The following is one particular example of how change repository 225 may be used by backup domain determinor 224. To start, change repository 225 may be up to date regarding memory addresses that have been modified since a last backup. When backup domain determinor 224 receives (e.g., from backup determinor 222) an indication that a backup is to begin, backup domain determinor 224 may access change repository 225 and determine which addresses need to be backed up. In some examples, if the address range that needs to be backed up is larger than a defined maximum size (e.g., a backup size threshold), backup domain determinor 224 may select just a portion of the address range to be backed up during the current backup and the rest may be backed up with subsequent backups. In this situation, change repository 225 may then continue to store, for the next backup, address ranges that were ready to be backed up during the current backup but were not selected because they exceeded the backup size threshold. Backup domain determinor 224 may, in some examples, determine a smallest addressable portion of the volatile memory 212 that includes the memory portion that is to be backed up. This smallest addressable portion may be the smallest address range that media controller 216 can access in volatile memory 212 and cause to be copied to non-volatile memory 214, where the smallest addressable portion still includes the memory portion that is to be backed up. Once an appropriate address range is selected for backup, backup domain determinor 224 may translate the addresses (i.e., physical addresses) to logical addresses appropriate for addressing the memory in memory module 210. This logical address range may be the backup domain. Backup domain determinor 224 may generate an ADR command (in the case of communication with memory controller 230) or a direct media command (in the case of communication with media controller 216) that is designed to cause a self-refresh in the memory module. The ADR command or direct media command may be further designed to cause only the selected addresses (backup domain) to be backed up in the memory module. Such an ADR command or direct media command may be an "enhanced" ADR command or direct media command that allows for indication of logical addresses to be backed up. In some examples, media controller 216 in the memory module may be capable of interpreting enhanced direct media commands. In some examples, memory controller 230 may be capable of interpreting enhanced ADR commands.

Memory deactivator 226 may prevent access to all or part of the memory modules (e.g., 210) of system 200 during backups. Memory deactivator 226 may, for example, disable part or all of the communication between memory controller 230 and memory module 210. Specifically, memory deactivator 226 may communicate with memory controller 230 to prevent memory controller 230 from writing to or reading from a particular memory address range in memory module 210. The particular memory address range that is prevented from access by memory controller 230 during a particular backup may be referred to as the "deactivation domain." The deactivation domain, in some examples, may be the entire volatile memory 212 of memory module 210. In these examples, memory controller 230 may still access other memory modules of system 200 while access to the deactivation domain is prevented. In other examples, the deactivation domain may be part of volatile memory 212 (e.g., a particular address range). In these examples, memory controller 230 may still access other parts of volatile memory 212 while access to the deactivation domain is prevented. In short, memory deactivator 226 may prevent access by the memory controller 230 to the deactivation domain during a backup, and may again allow access when it is determined (e.g., via backup completion handler 229) that the backup is complete (or failed). Memory deactivator 226 may, to determine the deactivation domain, determine a smallest addressable portion of the volatile memory 212 that includes the backup domain. This smallest addressable portion may be the smallest address range that memory controller 230 can access in volatile memory 212 and cause to be disabled (i.e., to prevent access).

In order to ensure that the deactivation domain is not accessed during a backup, memory deactivator 226 may also communicate with the operating system of system 200 such that the operating system is informed that the deactivation domain should not be accessed. In some examples where backup controller 220 is part of the operating system, the operating system may inherently be informed in this manner. Additionally, in order to ensure that the deactivation domain is not accessed during a backup, memory deactivator 226 may prevent any ancillary routines from running that may cause memory controller 230 to access volatile memory 212, for example, patrol scrubbers or other error correction routines such as ECC routines that automatically survey memory checking for errant bits.

Backup initiator 228 may initiate a backup, for example, once the backup domain is determined (e.g., via 224) and once the appropriate memory is deactivated (e.g., via 226). To initiate the backup, backup initiator 228 may, in some examples, send a request (e.g., an ADR command) to memory controller 230 to cause memory module 210 to enter a self-refresh mode. In other examples, to initiate the backup, backup initiator 228 may send a request (e.g., a direct media command) to media controller 216 to initiate a self-refresh of memory module 210. The request may include details of the backup, for example, the backup domain. Once the self-refresh is initiated, media controller 216 may coordinate backup of the backup domain from volatile memory 212 to non-volatile memory 214. In one particular example, and as described above, during a single backup, the backup domain may include memory addresses that include data that has been modified since a last backup. Once the backup is complete, and assuming all changed data is backed up to non-volatile memory 214, system 200 may be able to power cycle in a reliable manner, and the system may be able to reboot and restore the post-backup state using data that was backed up in non-volatile memory 214.

Backup completion handler 229 may detect when backups have completed or when they likely have failed. When a backup completes or fails, backup completion handler 229 may ensure that system 200 is transitioned back to a normal operating state (e.g., where all memory can be accessed). In some examples, backup completion handler 229 may maintain a completion timer. The timer may be reset/restarted when a backup is initiated (e.g., by 228). After a backup is initiated, backup completion handler may monitor for an indication that the backup is complete. To perform this monitoring, backup completion handler 229 may listen for a signal from media controller 216 that the backup is complete. Alternatively, backup completion handler 229 may poll registers of media controller 216 to determine whether a backup has finished, where the registers store backup progress information. If the timer runs out or passes a defined threshold before backup completion hander 229 receives an indication that the backup is complete, it may be determined that the backup likely failed.

Backup completion handler 229 may perform various tasks when a backup completes successfully. For example, backup completion handler 229 may ensure that the memory module 210 is brought out of self-refresh mode. In some examples, media controller 216 may handle this task automatically, and may notify backup completion handler when it is complete. Backup completion handler 229 may notify the operating system of system 200 that a backup completed successfully, and that memory module 210 is ready for normal use. Backup completion handler 229 may likewise notify memory controller 230 and may (e.g., with the assistance of memory deactivator 226) allow memory controller to once again access the deactivation domain in the memory of memory module 210.

Backup completion handler 229 may perform similar tasks to those described above when a backup is determined to have failed. For example, memory module 210 may be brought out of self-refresh and memory controller 230 may again access the deactivation domain in memory module 210, until the next backup attempt. Backup completion handler 229 may perform additional tasks when a backup is determined to have failed. For example, backup completion handler 229 may cause (e.g., by coordinating with the operating system) the data in volatile memory 212 that was intended to be backed up to be preserved in a different non-volatile storage (e.g., a hard drive or solid state drive).

Figure 3:
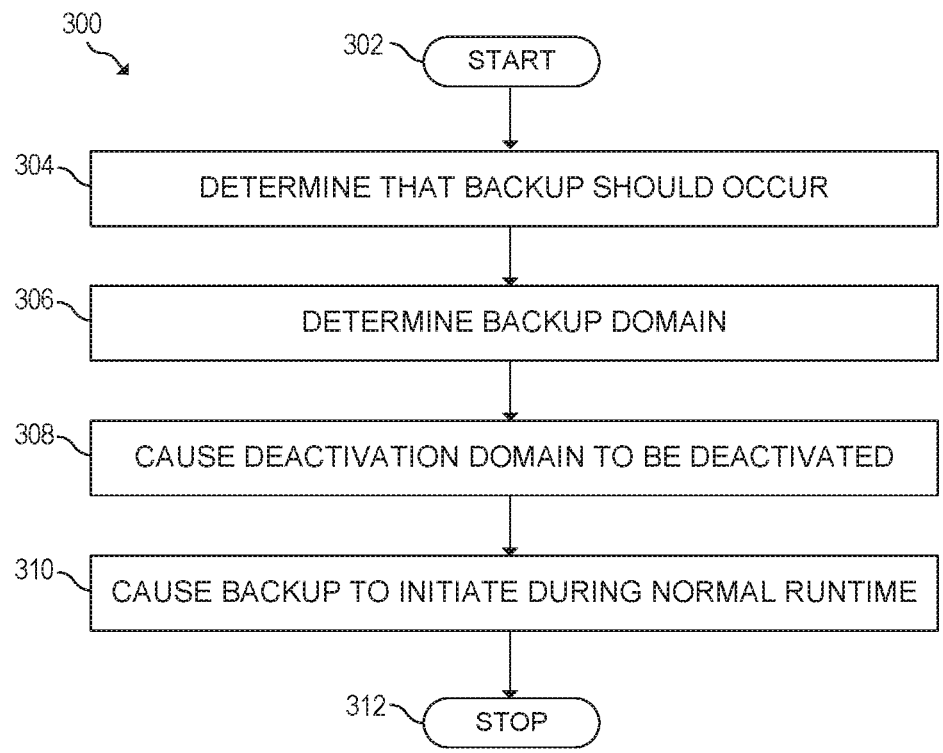
FIG. 3 is a flowchart of an example method for partial backup during runtime for memory modules with volatile memory and non-volatile memory.

FIG. 3 is a flowchart of an example method 300 for partial backup during runtime for memory modules with volatile memory and non-volatile memory. Method 300 may be described below as being executed or performed by a system, for example, system 100 of FIG. 1 or system 200 of FIG. 2. Other suitable systems and/or computing devices may be used as well. Method 300 may be implemented in the form of executable instructions stored on at least one machine-readable storage medium of the system and executed by at least one processor of the system. Alternatively or in addition, method 300 may be implemented in the form of electronic circuitry (e.g., hardware). In alternate embodiments of the present disclosure, one or more steps of method 300 may be executed substantially concurrently or in a different order than shown in FIG. 3. In alternate embodiments of the present disclosure, method 300 may include more or less steps than are shown in FIG. 3. In some embodiments, one or more of the steps of method 300 may, at certain times, be ongoing and/or may repeat.

Method 300 may start at step 302 and continue to step 304, where the system may determine that a backup should occur in a memory module of the system having a volatile memory and a non-volatile memory. At step 306, they system may determine a backup domain of the volatile memory. The backup domain may be defined by a range of memory addresses within the volatile memory module. At step 308, the system may cause a deactivation domain of the volatile memory to be deactivated, where the deactivation domain includes the backup domain. At step 310, the system may cause the backup to initiate during normal runtime of the system. The backup routine includes data in the backup domain of the volatile memory being saved to the non-volatile memory. Method 300 may eventually continue to step 312, where method 300 may stop.

Figure 4:
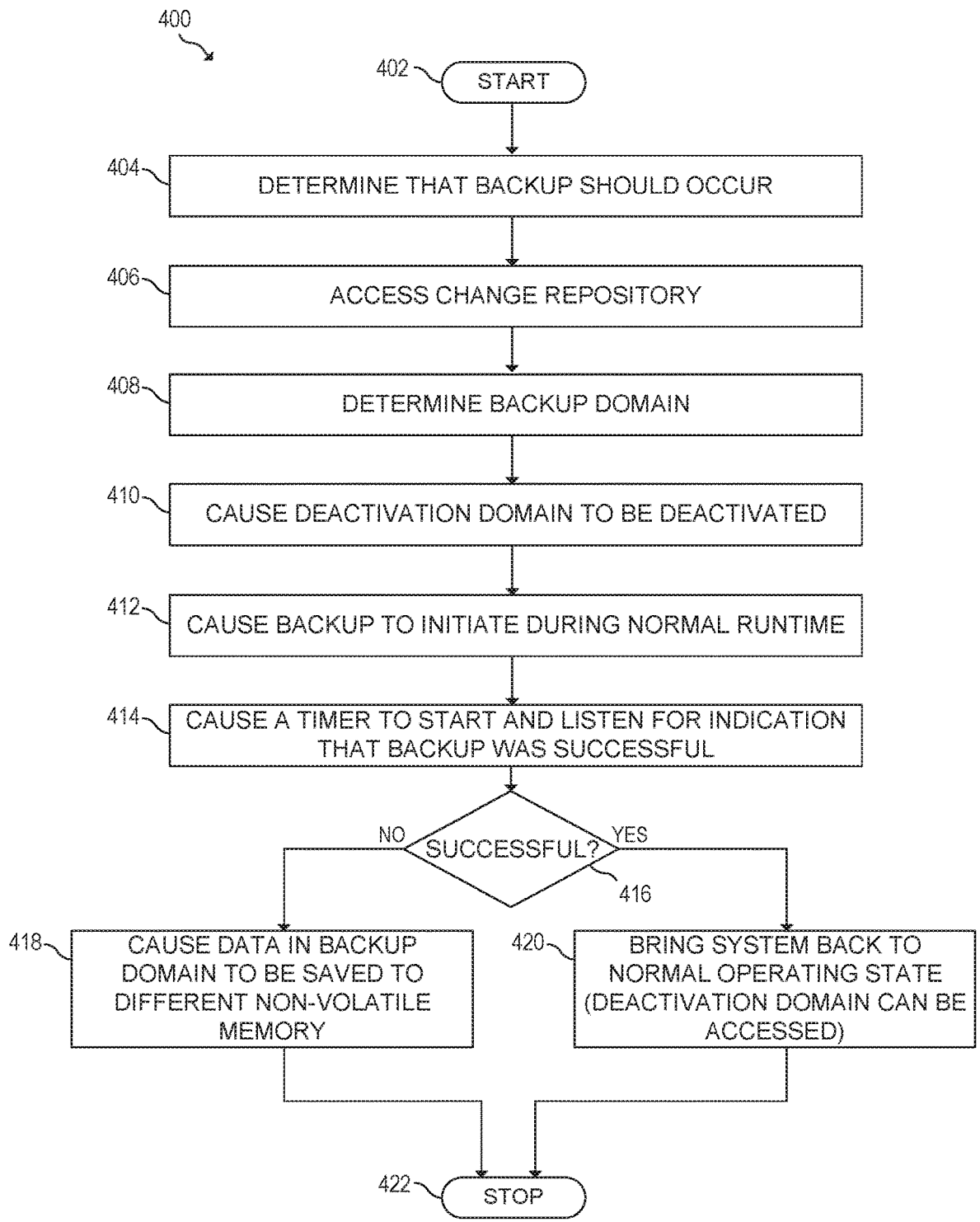
FIG. 4 is a flowchart of an example method for partial backup during runtime for memory modules with volatile memory and non-volatile memory.

FIG. 4 is a flowchart of an example method 400 for partial backup during runtime for memory modules with volatile memory and non-volatile memory. Method 400 may be described below as being executed or performed by a system, for example, system 200 of FIG. 2. Other suitable systems and/or computing devices may be used as well. Method 400 may be implemented in the form of executable instructions stored on at least one machine-readable storage medium of the system and executed by at least one processor of the system. Alternatively or in addition, method 400 may be implemented in the form of electronic circuitry (e.g., hardware). In alternate embodiments of the present disclosure, one or more steps of method 400 may be executed substantially concurrently or in a different order than shown in FIG. 4. In alternate embodiments of the present disclosure, method 400 may include more or less steps than are shown in FIG. 4. In some embodiments, one or more of the steps of method 400 may, at certain times, be ongoing and/or may repeat.

Method 400 may start at step 402 and continue to step 404, where the system may determine (e.g., via backup determinor 222 of FIG. 2) that a backup should occur in a memory module of the system having a volatile memory and a non-volatile memory. At step 406, the system may access (e.g., via backup domain determinor 224) a change repository (e.g., similar to 225), for example, to determine a portion of the volatile memory that has changed since a previous backup. At step 408, the system may determine (e.g., via backup domain determinor 224) a backup domain of the volatile memory. Step 408 may use the information accessed at step 406. The backup domain may be defined by a range of memory addresses within the volatile memory module. At step 410, the system may cause (e.g., via memory deactivator 226) a deactivation domain of the volatile memory to be deactivated, where the deactivation domain includes the backup domain.

At step 412, the system may cause (e.g., via backup initiator 228) the backup to initiate during normal runtime of the system. The backup process includes data in the backup domain of the volatile memory being saved to the non-volatile memory. At step 414, the system may cause a timer to start and may listen for an indication that the backup was successful, as described in more detail above. At step 416, the system may determine whether the backup was successful. If the backup was not successful, method 400 may proceed to step 418, where the system may cause data in the backup domain to be save to a different non-volatile memory external to the memory module. If the backup was successful, method 400 may proceed to step 420, where the system may bring the system back to a normal operating state (e.g., where the deactivation domain can be accessed by a memory controller of the system). Method 400 may eventually continue to step 422, where method 400 may stop.

Figure 5:
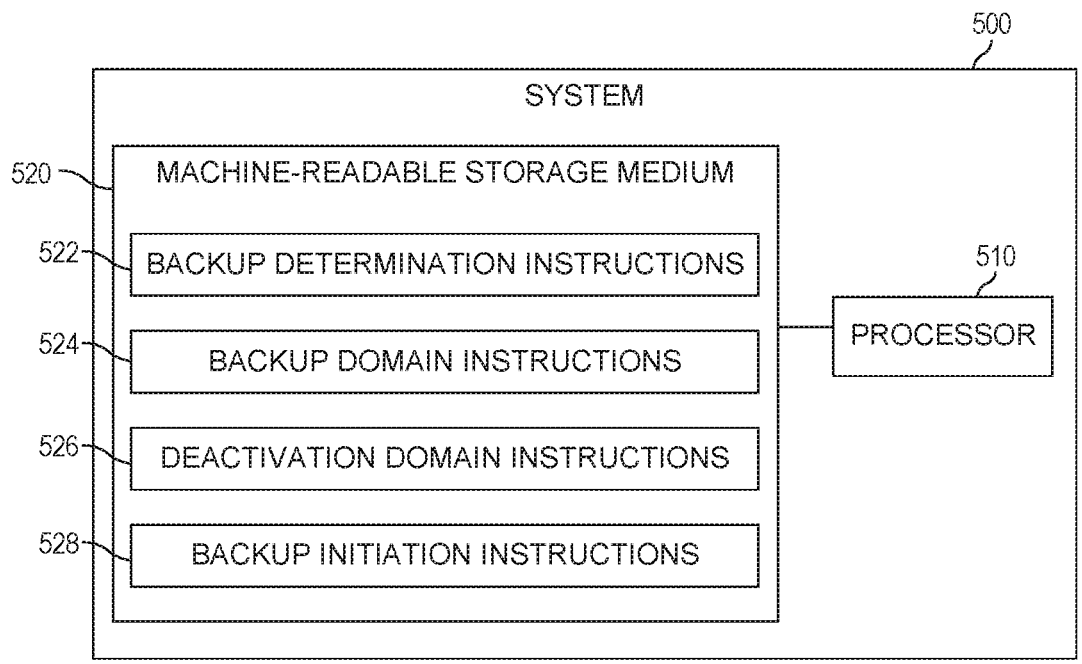
FIG. 5 is a block diagram of an example system for partial backup during runtime for memory modules with volatile memory and non-volatile memory.

FIG. 5 is a block diagram of an example system 500 for partial backup during runtime for memory modules with volatile memory and non-volatile memory. System 500 may be similar to system 100 of FIG. 1 or system 200 of FIG. 2, for example. In the embodiment of FIG. 5, system 500 includes a processor 510 and a machine-readable storage medium 520. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 510 may be one or more central processing units (CPUs), microprocessors, and/or other hardware devices suitable for retrieval and execution of instructions stored in machine-readable storage medium 520. In the particular embodiment shown in FIG. 5, processor 510 may fetch, decode, and execute instructions 522, 524, 526, 528 to adapt a navigation menu. As an alternative or in addition to retrieving and executing instructions, processor 510 may include one or more electronic circuits comprising a number of electronic components for performing the functionality of one or more of the instructions in machine-readable storage medium 520. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 520 may be any electronic, magnetic, optical, or other physical storage device that stores executable instructions. Thus, machine-readable storage medium 520 may be, for example, Random Access Memory (RAM), an Electrically-Erasable Programmable Read-Only Memory (EEPROM), a storage drive, an optical disc, and the like. Machine-readable storage medium 520 may be disposed within system 500, as shown in FIG. 5. In this situation, the executable instructions may be "installed" on the system 500. Alternatively, machine-readable storage medium 520 may be a portable, external or remote storage medium, for example, that allows system 500 to download the instructions from the portable/external/remote storage medium. In this situation, the executable instructions may be part of an "installation package". As described herein, machine-readable storage medium 520 may be encoded with executable instructions for partial backup during runtime for memory modules with volatile memory and non-volatile memory.

Referring to FIG. 6, backup determination instructions 522, when executed by a processor (e.g., 510), may cause system 500 to determine that a backup should occur in a memory module of the system having a volatile memory and a non-volatile memory. Backup domain instructions 524, when executed by a processor (e.g., 510), may cause system 500 to determine a backup domain of the volatile memory. Deactivation domain instructions 526, when executed by a processor (e.g., 510), may cause system 500 to cause a deactivation domain of the volatile memory to be deactivated, where the deactivation domain includes the backup domain. Backup initiation instructions 528, when executed by a processor (e.g., 510), may cause system 500 to initiate the backup during normal runtime of the system by indicating to the memory module that it should initiate a self-refresh routine. The backup routine includes data in the backup domain of the volatile memory being saved to the non-volatile memory.

The invention claimed is:

1. A system for partial backup during runtime, the system comprising:
    a memory module having a volatile memory and a non-volatile memory; and
    a backup controller to:
        determine that a backup should occur in the memory module;
        determine a backup domain of the volatile memory;
        cause a deactivation domain of the volatile memory to be deactivated, where the deactivation domain includes the backup domain; and
        cause the backup to initiate during normal runtime of the system, the backup including data in the backup domain of the volatile memory being saved to the non-volatile memory;
    wherein to determine the backup domain, the backup controller accesses a change repository that indicates a portion of the volatile memory that is ready to be backed up but was not backed up during a previous backup because that portion exceeded a backup size threshold of the previous backup.

2. The system of claim 1, wherein to determine the deactivation domain, the backup controller determines a smallest addressable portion of the volatile memory that includes the backup domain.

3. The system of claim 1, wherein to cause the backup to initiate, the backup controller indicates to the memory module that it should initiate a self-refresh routine.

4. The system of claim 1, wherein the backup controller is further to receive an indication that the backup completed successfully, and in response, allow access to the deactivation domain that was deactivated.

5. The system of claim 1, wherein the backup controller is further to:
    cause a timer to start when the backup is initiated;
    listen for an indication that the backup completed successfully; and
    when the timer expires without the backup controller receiving the indication that the backup completed successfully, cause the data in the backup domain of the volatile memory to be saved in a different non-volatile memory external to the memory module.

6. A method for partial backup during runtime of a system, the method comprising:
    determining that a backup should occur in a memory module of the system having a volatile memory and a non-volatile memory;
    determining a backup domain of the volatile memory, the backup domain being defined by a range of memory addresses within the volatile memory module, causing a deactivation domain of the volatile memory to be deactivated, wherein the deactivation domain includes the backup domain; and
    causing the backup to initiate during normal runtime of the system by indicating to the memory module that it should initiate a self-refresh routine, the backup including data in the backup domain of the volatile memory being saved to the non-volatile memory;
    wherein indicating to the memory module that it should initiate a self-refresh routine includes sending a direct media command to a media controller of the memory module, where the media controller causes the memory module to start the self-refresh routine.

7. The method of claim 6, wherein the deactivation domain is smaller than the total size of the volatile memory, and wherein, during the backup, access by a memory controller of the system is prevented to the deactivation domain while access to other portions of the volatile memory is allowed.

8. The method of claim 6, wherein determining the backup domain includes accessing a change repository of the system that indicates a portion of the volatile memory that has changed since a previous backup.

9. The method of claim 6, further comprising:
    cause a timer to start when the backup is initiated;
    listening for an indication that the backup completed successfully; and
    when the timer expires without the backup controller receiving the indication that the backup completed successfully, causing the data in the backup domain of the volatile memory to be saved in a different non-volatile memory external to the memory module.

10. A machine-readable storage medium encoded with instructions for partial backup during runtime, the instructions executable by a processor of a system to cause the system to:
    determine that a backup should occur in a memory module of the system having a volatile memory and a non-volatile memory;
    determine a backup domain of the volatile memory;
    cause a deactivation domain of the volatile memory to be deactivated, where the deactivation domain includes the backup domain; and
    cause the backup to initiate during normal runtime of the system by indicating to the memory module that it should initiate a self-refresh routine, the backup including data in the backup domain of the volatile memory being saved to the non-volatile memory wherein indicating to the memory module that it should initiate a self-refresh routine includes sending a direct media command to a media controller of the memory module, where the media controller causes the memory module to start the self-refresh routine.

11. A machine-readable storage medium of claim 10, wherein indicating to the memory module that it should initiate a self-refresh routine includes sending an Asynchronous DRAM Refresh (ADR) command to a memory controller of the system, where the memory controller then signals to the memory module to start the self-refresh routine.

\* \* \* \* \*